US011925601B2

(12) United States Patent
Bouteloup et al.

(10) Patent No.: US 11,925,601 B2
(45) Date of Patent: Mar. 12, 2024

(54) DEVICE FOR TEMPORARILY CONNECTING TWO CONTAINERS

(71) Applicant: CORADIN SAS, Mouans-Sartoux (FR)

(72) Inventors: David Bouteloup, Peymeinade (FR); Fabrice Bourdier, Montauroux (FR); Florence Bidamant, Mulhouse (FR)

(73) Assignee: CORADIN SAS, Mouans-Sartoux (FR)

( * ) Notice: Subject to any disclaimer, the term of this patent is extended or adjusted under 35 U.S.C. 154(b) by 54 days.

(21) Appl. No.: 17/253,604

(22) PCT Filed: Oct. 18, 2019

(86) PCT No.: PCT/FR2019/052487
§ 371 (c)(1),
(2) Date: Dec. 17, 2020

(87) PCT Pub. No.: WO2020/079383
PCT Pub. Date: Apr. 23, 2020

(65) Prior Publication Data

US 2021/0228445 A1 Jul. 29, 2021

(30) Foreign Application Priority Data

Oct. 19, 2018 (FR) ...................................... 1871237

(51) Int. Cl.
*A61J 1/20* (2006.01)
*A61J 1/14* (2023.01)
(Continued)

(52) U.S. Cl.
CPC ........... *A61J 1/2089* (2013.01); *A61J 1/1418* (2015.05); *A61J 1/2027* (2015.05);
(Continued)

(58) Field of Classification Search
CPC .... A61J 1/2089; A61J 1/2027; B65D 81/3288
(Continued)

(56) References Cited

U.S. PATENT DOCUMENTS 4,986,322 A * 1/1991 Chibret .............. B65D 81/3211 141/366
5,833,089 A * 11/1998 Manni ................ B65D 81/3211 141/366

(Continued)

FOREIGN PATENT DOCUMENTS

CL 199901993 A 6/2000
CL 200003256 11/2001

(Continued)

OTHER PUBLICATIONS

International Search Report and Written Opinion on PCT/FR2019/052487, dated Feb. 7, 2020 (12 pages, including English translation).

(Continued)

*Primary Examiner* — Timothy L Maust
(74) *Attorney, Agent, or Firm* — Foley & Lardner LLP

(57) ABSTRACT

A system for connecting containers which is intended for the temporary assembly of a first and a second container, said connection system comprising a closing sleeve, provided with a first part suitable for being mounted on the first container, and said closing sleeve also being provided with a second part which is suitable for allowing the temporary mounting of the opening of the second container and a membrane separating said first and said second part of said closing sleeve, said membrane being suitable for being perforated by the second container during the mounting of the latter on the second part of the closing sleeve, characterised in that said connection system comprises a lid intended for closing off the second part of the closing sleeve before the connection system is used, said lid and said closing sleeve being obtained by means of a simultaneous method of moulding by injection of at least one plastic material, the lid being mounted on the second part of the
(Continued)

closing sleeve once the lid and the closing sleeve have exited their respective moulds.

11 Claims, 5 Drawing Sheets

(51) Int. Cl.
*B65D 41/34* (2006.01)
*B65D 81/32* (2006.01)

(52) U.S. Cl.
CPC ...... *B65D 41/3485* (2013.01); *B65D 81/3211* (2013.01); *B65D 2401/20* (2020.05)

(58) Field of Classification Search
USPC .......................................................... 141/319
See application file for complete search history.

(56) References Cited

U.S. PATENT DOCUMENTS

| | | | | |
|---|---|---|---|---|
| 6,237,649 | B1 * | 5/2001 | Moisio | A61J 1/2089 141/319 |
| 7,607,460 | B2 * | 10/2009 | Johns | B65D 81/3211 141/319 |
| 9,610,223 | B2 | 4/2017 | Domkowski et al. | |
| 2007/0289670 | A1 | 12/2007 | Johns et al. | |
| 2012/0330267 | A1 | 12/2012 | Domkowski et al. | |
| 2013/0037509 | A1 | 2/2013 | Rahimy et al. | |

FOREIGN PATENT DOCUMENTS

| | | | |
|---|---|---|---|
| CL | 200102505 | A | 11/2002 |
| CL | 201603039 | | 6/2017 |
| CL | 201703187 | | 6/2018 |
| CN | 1433293 | A | 7/2003 |
| CN | 1897908 | A | 1/2007 |
| CN | 202376460 | | 8/2012 |
| CO | 6801680 | A2 | 11/2013 |
| EP | 1 837 005 | A1 | 9/2007 |
| FR | 2427960 | A1 | 1/1980 |
| GB | 2 477 382 | A | 8/2012 |
| RU | 2190385 | C2 | 10/2002 |
| WO | WO-00/02795 | A1 | 1/2000 |
| WO | WO-2006/122456 | A1 | 11/2006 |

OTHER PUBLICATIONS

Russian Office Action for RU Appln 2021103884 dated Nov. 11, 2021 (14 pages, including English translation).
Chilean Office Action CL Appln No. 202100701 dated Jul. 13, 2022.
Columbian Office Action on CO Appln No. NC2021/0002485 dated Nov. 30, 2022.
Indian Office Action on IN Appln No. 202117007779 dated Oct. 19, 2022.
First Chinese Search Report on CN Patent Appln No. 201980044754.8, dated Nov. 11, 2023 (7 pages).

* cited by examiner

[figure 1]
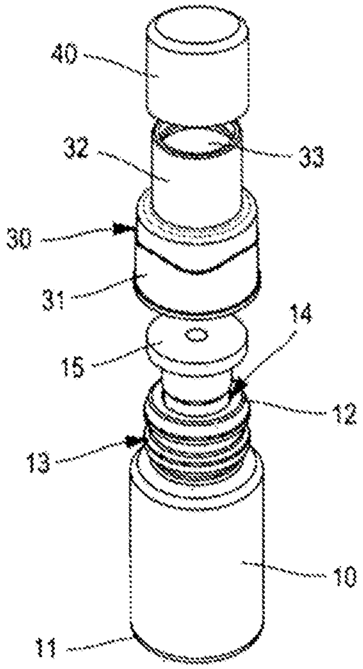
[figure 2]
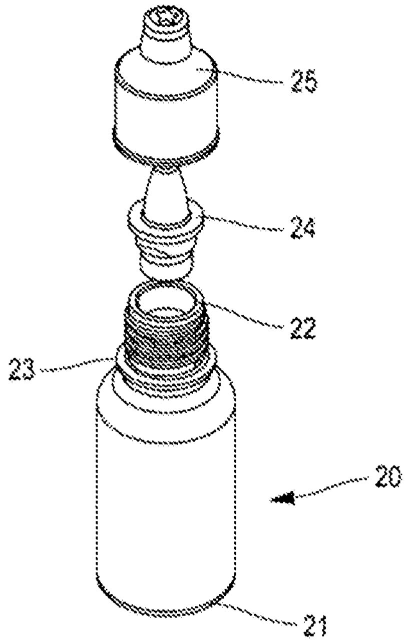

[figure 3]
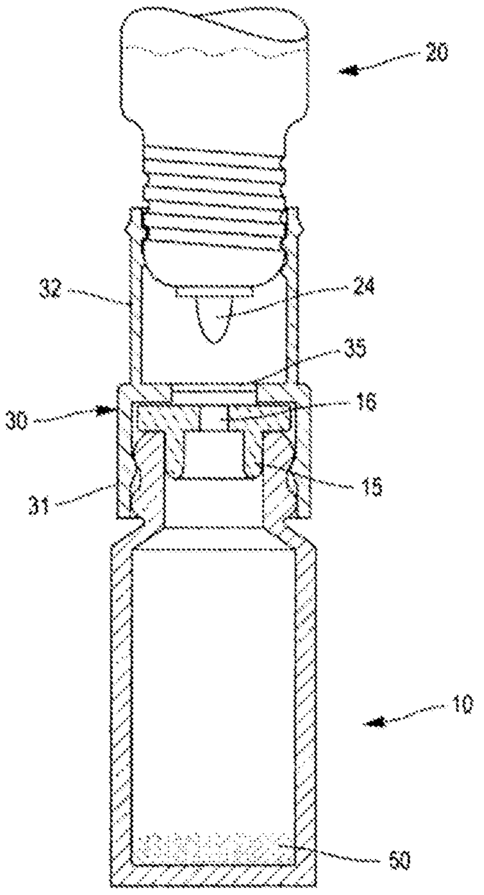
[figure 4]
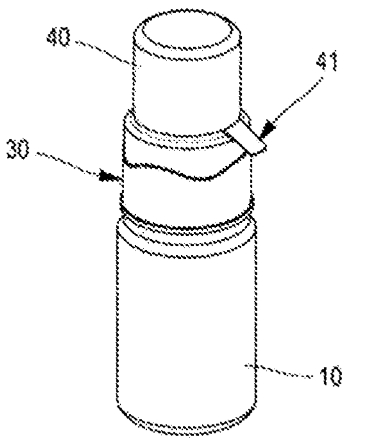

[figure 5]
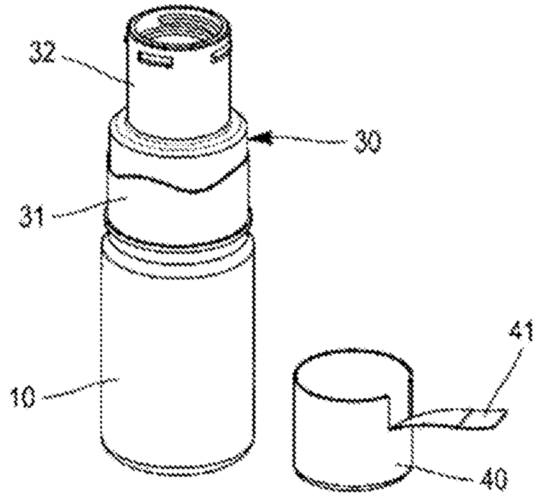
[figure 6]
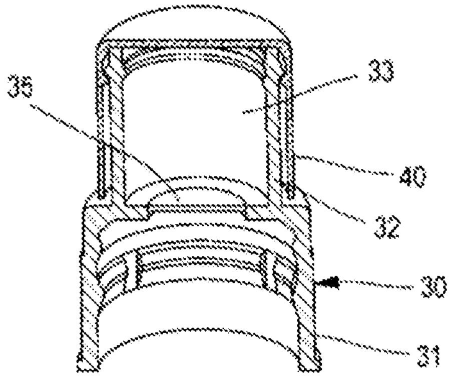

[figure 7]
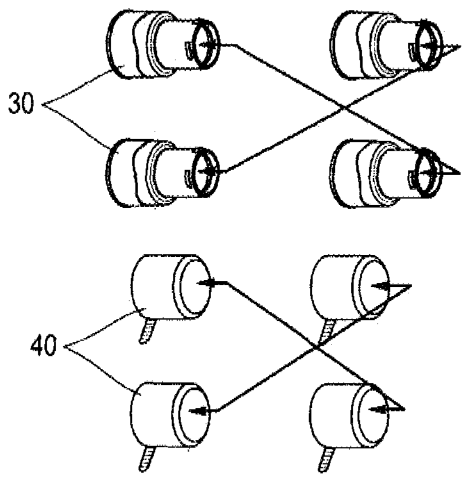
[figure 8]
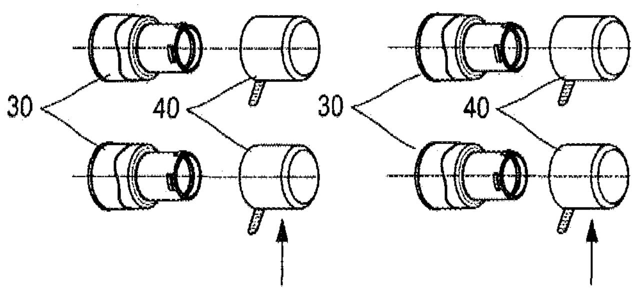

[figure 9]
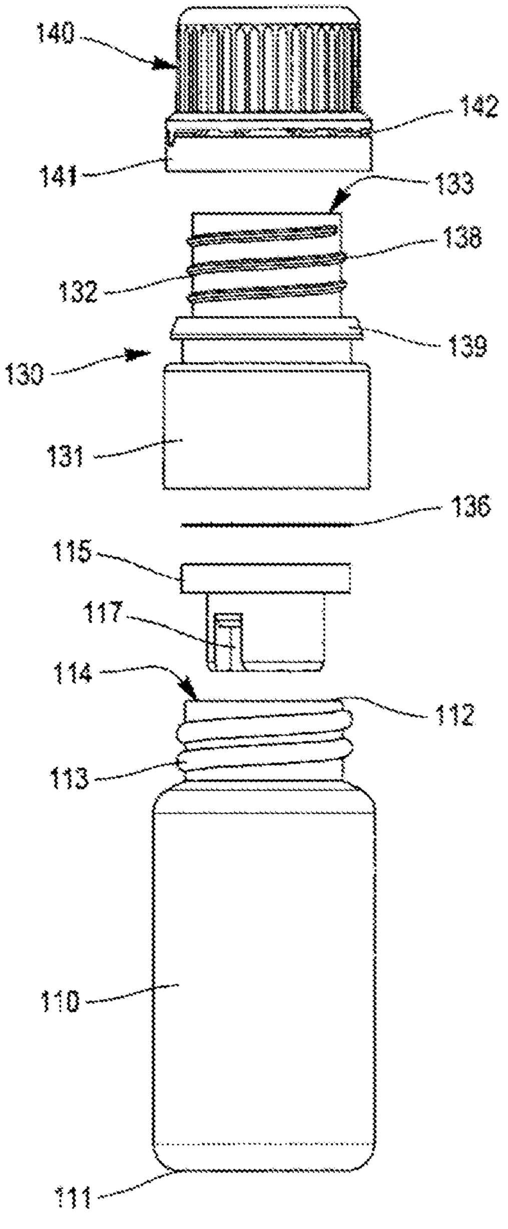

DEVICE FOR TEMPORARILY CONNECTING TWO CONTAINERS

CROSS-REFERENCE TO RELATED APPLICATIONS

The present application is a U.S. National Stage Application under 35 U.S.C. § 371 of international application no. PCT/FR2019/052487, filed on Oct. 18, 2019, which claims priority to French patent application no. 1871237, filed on Oct. 19, 2018, the disclosure of each of which is incorporated herein by reference in its entirety.

FIELD OF THE INVENTION

The invention relates to a device for connecting containers which is intended for the temporary assembly of said containers, generally a flask for containing a substance and a bottle for containing a fluid, with the aim of mixing said substance, such as a powder, a lyophilisate or a liquid, and said fluid, such as a solvent.

According to the present invention, the connection system comprises a closing sleeve, the first part of which is provided with a mounting system for ensuring an impermeable connection to the opening of the flask and a second part of which is suitable for allowing the temporary mounting of the opening of the bottle. In order to avoid the contents of the flask accidentally flowing from said flask and from being exposed to the influence of the ambient air or water, the closing sleeve comprises a membrane separating the first and the second part of said closing sleeve. The connection system is suitable for allowing the membrane separating the first and the second part of the closing sleeve to be perforated once the bottle is mounted on the second part of the closing sleeve. When the flask and the bottle are mounted inside the closing sleeve, the fluid contained in said bottle may flow, by virtue of repeated pressure on the bottle or any pliable element of the bottle, such as a pliable bottom, and penetrate into said flask, thus allowing the substance and said fluid to mix.

After the mixing of the substance and the fluid, said mixture may be transferred into the bottle and used at a place and time preferred by the user.

STATE OF THE ART

Systems which allow a substance and a fluid to be packaged within two distinct containers with the aim of mixing said substance and said fluid, at a moment chosen by the user, are already known in the prior art. Such a system is, for example, disclosed within document EP 1009356 and is suitable for connecting, temporarily, a flask made of a rigid material, such as glass, to a bottle made of a flexible material, such as plastic. According to the teaching of document EP 1009356, the flask is particularly suitable for protecting the substance contained in it from the influence of various external elements such as water or oxygen, and thus preserving the properties of said substance contained in said flask. The device as shown in document EP 1009356 may contain a product such as a cosmetic product and/or a pharmaceutical product intended for treating the skin. The substance used for such a treatment typically has active ingredients which have beneficial effects on the skin. Said active ingredients, which are protected by the flask, are not degraded during filling, any lyophilisation process or storage in the flask. The user may mix the substance and the fluid just before use, with the aid of the system disclosed within document EP 1009356, in order to obtain a mixture which can be used to treat the skin.

It should be noted that the connection system such as disclosed within document EP 1009356 comprises a closing sleeve provided with a second part, which makes it possible for the opening of a bottle, which is substantially cylindrical in shape, to be temporarily mounted. Inside said cylinder, the second part of the closing sleeve is provided with a thread which makes it possible for the bottle to be temporarily mounted with the aid of said thread. Before use, said second part of said closing sleeve is open and comprises an inner wall exposed to ambient air. Said inner wall, which is not sterile, is consequently not protected against possible contamination.

If the container connection system according to the document EP 1009356 is used to mix a substance and a fluid, such as described above, it is possible for contamination potentially present on the inner wall of the closing sleeve to spread into the flask during the steps of transferring said fluid.

For the reason set out in the paragraph above, the container connection system such as disclosed in document EP 1009356 is not suitable for mixing pharmaceutical products, which must imperatively remain sterile before they are used.

With regard to the observations above, it appears that there is a need to improve the existing container connection systems intended to allow the mixing of a substance and a fluid.

One of the objectives of the present invention consists in supplying a system for connecting containers which is improved relative to the system known in the prior art.

Another objective of the present invention consists in supplying a system for connecting containers comprising inner walls which remain sterile before said system for connecting containers is used.

Another objective of the present invention consists in supplying a system for connecting containers, the presence of sterile inner walls of which gives rise to as low additional costs as possible during the production of such a system for connecting containers.

SUBJECT OF THE INVENTION

The subject of the present invention is a system for connecting containers which is intended for the temporary assembly of a first and a second container, said connection system comprising a closing sleeve, provided with a first part suitable for being mounted on the first container, and said closing sleeve also being provided with a second part which is suitable for allowing the temporary mounting of the opening of the second container, and with a membrane separating said first and said second part of said closing sleeve, said membrane being suitable for being perforated by the second container during the mounting of the latter on the second part of the closing sleeve, wherein said connection system comprises a lid intended for closing off the second part of the closing sleeve before the connection system is used, said lid and said closing sleeve being obtained by means of a simultaneous method of moulding by injection of a plastic material, the lid being mounted on the second part of the closing sleeve once the lid and the closing sleeve have exited their respective moulds.

According to one embodiment of the invention, the lid is mounted on the second part of the closing sleeve before the lid and said closing sleeve are cooled to ambient temperature.

According to one embodiment of the invention, the membrane is an integral element of the closing sleeve and comprises a plastic material that is substantially similar, preferably similar, to the material used for the first part and the second part of said closing sleeve.

According to one embodiment of the invention, the lid is provided with a frangible zone in the form of a tearable tab suitable for being pulled off and thus facilitating the removal of said lid from the second part of the closing sleeve.

A second aspect of the present invention relates to a method for obtaining a system for connecting containers which is intended for the temporary assembly of a first and a second container, said connection system comprising a closing sleeve provided with a lower part suitable for being mounted on the first container and provided with an upper part which is suitable for allowing the mounting of the opening of the second container and provided with an integrated membrane, said membrane separating the upper part from the lower part of the closing sleeve, said membrane being suitable for being perforated by the second container when the latter is mounted on the upper part of said closing sleeve, wherein said method comprises the following steps:

- forming the closing sleeve and the lid by using a simultaneous method of moulding simultaneously by injection of at least one plastic material,
- mounting the lid on the second part of the connection device in order to thus close off said second part of the closing sleeve once the lid and said closing sleeve have exited their respective moulds.

According to one embodiment of the invention, the lid is mounted on the second part of the closing sleeve before said lid and said closing sleeve are cooled to ambient temperature.

BRIEF DESCRIPTION OF THE DRAWINGS

The aim, object and characteristics of the present invention will become more clearly apparent when reading the following present description, with reference to the drawings in which:

FIG. 1 shows a system for connecting containers, according to a first embodiment, comprising a flask, a joining element, a closing sleeve and a lid during the assembly thereof, FIG. 2 depicts a bottle, a dropper and a lid during the assembly thereof, FIG. 3 shows the flask and the closing sleeve according to FIG. 1, and a bottle during the mounting of said bottle in said closing sleeve, FIG. 4 depicts the flask, the closing sleeve and the lid according to FIG. 3, after the assembly thereof, FIG. 5 depicts the assembly according to FIG. 4 with the lid removed, FIG. 6 shows a partial cross-sectional view of a closing sleeve and a lid fixed on the second part of said closing sleeve, FIG. 7 depicts a schematic view of a plurality of closing sleeves ready to exit their mould, and a plurality of lids, FIG. 8 shows a schematic view of the positioning of a plurality of lids aligned with, respectively, a plurality of closing sleeves before said closing sleeves leave their respective moulds, and FIG. 9 depicts a second embodiment of a flask and a closing sleeve according to the invention.

FIG. 1 shows a flask 10 specifically suitable for packaging a substance such as a powder, a lyophilisate or a liquid. Said flask 10 is produced from a material suitable for protecting the substance contained within it from the influence of exterior elements, such as, inter alia, oxygen ($O_2$) and water ($H_2O$). Glass is a material which is entirely suitable for fulfilling this function. The flask 10 comprises a bottom 11, at its lower end, and an opening 14 situated at its upper end 12. Said opening is suitable for allowing the contents of said flask 10 to exit. Close to its upper end 12, the flask 10 is provided with mounting means 13, for example in the form of circular protrusions forming a surface onto which the closing sleeve 30 may be mounted.

FIG. 1 depicts a joining element 15 suitable for being introduced inside the flask 10 to allow an impermeable connection between said flask 10 and the closing sleeve 30. The joining element 15 may be produced, for example, from a flexible material such as rubber or elastomeric thermoplastic. The closing sleeve 30, as shown FIG. 1, is provided with a first part 31 suitable for being mounted on the flask 10. It is not necessary to remove the closing sleeve 30 from the flask 10 during the use of said flask 10.

The closing sleeve 30 comprises a second part 32 specifically suitable for the temporary mounting of a bottle (as shown in FIG. 2). The inner wall 33 of the second part 32 is provided with mounting means (not shown in FIG. 1) which allow said temporary mounting of said bottle. The mounting means present on the inner wall 33 of the second part 32 of the closing sleeve 30 take the form of a thread, for example.

The second part 32 of the closing sleeve 30 may be closed off, before using the flask 10 and said closing sleeve 30, with the aid of a lid 40.

FIG. 2 depicts a bottle 20 particularly suitable for being used in combination with the flask 10 and the closing sleeve 30, as shown in FIG. 1. The bottle 20 is suitable for packaging a fluid which can be mixed with the substance packaged in the flask 10. Said fluid, packaged in the bottle 20 may be, for example, a solvent which is suitable for dissolving, at least partly, the substance contained in the flask 10 and/or for forming an emulsion or suspension with said substance after the mixing of said substance contained in the flask 10 and the fluid contained in the bottle 20.

The bottle 20 has a lower end 21 forming the bottom of said bottle 20, and an upper end 22 provided with an opening suitable for allowing the contents of said bottle 20 to flow outwards. A dispenser 24 may be positioned on the opening situated at the upper end 22 of the bottle 20. Said dispenser 24 may be used to expel a precise dose of the contents of the bottle 20 outwards. At its upper end 22, the bottle 20 is provided with mounting means 23, such as a thread, which allows the temporary mounting of said bottle 20 inside the second part 32 of the closing sleeve 30, as shown in FIG. 1. Said mounting means 23 may also be used to mount a lid 25, said lid making it possible to protect the contents of the bottle 20 before they are used.

The bottle 20 is typically made of a flexible plastic material. The flexibility of the outer wall of the bottle 20 allows the user to exert, with his/her finger, a certain pressure on the exterior of said bottle 20 in order to deform it. The deformation of the bottle 20 allows its contents to be expelled with the aid of the dispenser 24.

FIG. 3 shows the mounting of the bottle 20 inside the second part 32 of the closing sleeve 30. To allow said mounting, the lid 25 has firstly been removed. When the bottle 20 is introduced inside the second part 32 of the closing sleeve 30, said bottle may be advanced in the direction of a membrane 35. Said membrane 35 has the function of separating the interior of the first part 31 of the closing sleeve 30 and the interior of the second part 32 of said closing sleeve 30. The presence of said membrane 35 protects the substance 50 present inside the flask 10, before said flask 10 and said closing sleeve 30 are used. According to a preferred embodiment, the membrane 35 is an integral part of the closing sleeve 30, this membrane being produced from the same material as the first part 31 and the second part 32 of said closing sleeve 30. The membrane 35 forms a frangible zone suitable for being perforated by the dispenser 24 of the bottle 20 during the introduction of said bottle 20 inside the second part 32 of the closing sleeve 30. When the membrane 35 is perforated, the dispenser 24 may continue to advance until it is received inside an opening 16 present in the joining element 15. Said joining element 15 is present between the upper part of the flask 10 and the interior of the first part 31 of the closing sleeve 30.

The dispenser 24 is preferably produced using a relatively rigid material. The rigidity of the dispenser 24 allows it to perforate the membrane 35 without the dispenser itself being deformed. Furthermore, the presence of the relatively rigid dispenser 24 and a joining element 15, which is relatively flexible and provided with an opening 16 intended for receiving said dispenser 24, guarantees an impermeability between the exterior of the dispenser 24 and the interior of the opening 16 after the full introduction of the bottle 20 inside the second part 32 of the closing sleeve 30.

After the full introduction of the bottle 20 inside the second part 32 of the closing sleeve 30, the fluid contained inside said bottle 20 may flow to the interior of the flask 10 by deforming the bottle 20 to increase the pressure inside said bottle 20. When the fluid is thus transferred from the bottle 20 to the interior of the flask 10, it is possible to agitate the assembly of the flask 10, the closing sleeve 30 and the bottle 20 in order to obtain mixing between the substance 50, present inside the flask 10, and the fluid (not shown in FIG. 3). After said fluid and the substance 50 have mixed, the assembly of the flask 10, the closing sleeve 30 and the bottle 20 may be arranged vertically so that the flask is above the bottle 20 and, by aspirating due to a deformation of the bottle 20, allow the transfer of the mixture of the substance 50 and the fluid from the flask 10 to the bottle 20. Once the mixture is aspirated inside the bottle 20, the latter may be used to dispense said mixture, in a controlled manner, on the one hand with the aid of the deformation of the outer wall of the bottle 20 and, on the other hand, by using the dispenser 24. When the user no longer wishes to dispense the mixture, the bottle 20 may be closed off with the aid of the lid 25 (as shown in FIG. 2).

The assembly of the flask 10, the closing sleeve 30 and the bottle 20, according to the invention, is particularly suitable for mixing a fluid and a substance 50, namely by virtue of a closing sleeve 30 provided with a sterile interior. The sterile interior avoids the potential contamination of the mixture of said fluid and said substance 50. To guarantee a sterile interior, the second part 32 of the closing sleeve 30 is, before use, closed off with the aid of a lid 40. The closing-off of the closing sleeve 30 with a lid 40 is depicted in FIG. 4.

FIG. 4 depicts the closing sleeve 30 mounted on the upper part of the flask 10. The second part 32 of said closing sleeve 30 is enveloped and closed off with the aid of a lid 40. To remove the lid 40, the latter is provided with a tearable tab 41. A frangible zone, present between said tearable tab 41 and the body of the lid 40, facilitates the removal of the tearable tab 41. When the tearable tab 41 is removed, the removal of the lid 40 from the closing sleeve 30 is facilitated.

FIG. 5 shows the assembly of the flask 10 and the closing sleeve 30 after the removal of the lid 40. According to the position as shown in FIG. 5, the assembly of the flask 10 and said closing sleeve 30 is ready to receive the bottle 20, as shown in FIG. 3, inside the second part 32 of the closing sleeve 30.

FIG. 6 depicts a partial cross-sectional view of the assembly of the closing sleeve 30 and the lid 40 after the assembly thereof. In FIG. 6, it is possible to see the presence of the membrane 35, said membrane 35 being suitable for closing off the interior of the first part 31 relative to the interior of the second part 32 of the closing sleeve 30. The lid 40 is present to protect the inner wall 33 from any form of potential contamination before the use of the closing sleeve 30. In order to guarantee that the first part 31 of said closing sleeve 30 has a sterile interior, before it is used, the interior of said first part 31 is sterilised before and/or during the mounting of the closing sleeve 30 on the flask 10. The permanent mounting of the first part 31 on the flask 10 (as shown in FIGS. 3 to 5) guarantees the non-contamination of the interior of the first part 31 of the closing sleeve 30 before it is used.

According to the invention, the interior of the second part 32 of the closing sleeve 30 (as shown in FIG. 6) is kept sterile in a particular manner.

FIG. 7 schematically shows a plurality of closing sleeves 30 and a plurality of lids 40. According to the present invention, said closing sleeves 30 and said lids 40 are obtained by means of a simultaneous injection-moulding method. In other words, said closing sleeves 30 and said lids 40 are directly assembled as soon as they are extracted from their respective moulds, guaranteeing that the interior of the second part 32 of the closing sleeves 30 and the interior of the lids 40 are perfectly sterile.

FIG. 8 depicts a schematic view of an assembly such as described in the paragraph above. A first mould, suitable for the production of a plurality of closing sleeves 30, is positioned close to a second mould suitable for the production of a plurality of lids 40. According to the example depicted in FIG. 8, the lids 40 are extracted from their respective moulds and each of them is positioned at the site where the closing sleeves 30 are each extracted from their respective moulds. When the lids 40 are positioned at the ends of the closing sleeves 30, as shown in FIG. 8, said closing sleeves 30 are advanced, and extracted from their respective moulds, in order to be automatically introduced, with their respective second part 32, inside each of the lids 40. When the assembly of the closing sleeves 30 and the respective lids 40 is produced, the assembly of said closing sleeves 30 and said lids 40 is removed from the exit of the zone intended for the production of the closing sleeves 30, thus allowing the exit of the products that follow.

The closing sleeves 30 and the lids 40 are typically produced with the aid of a plastic material such as HDPE or PP. A product obtained with the aid of the aforementioned materials presents, upon exit from the mould, a temperature of around 50° C. to 70° C. With regard to the materials' transformation temperature greater than 200° C. and the high temperature upon exit from the mould, it is found that the wall 33 of each of the second parts 32 of each of the closing sleeves 30 remains sterile. This indicates that the positioning of the lid 40, on the second part 32 of the closing sleeve 30, guarantees the impermeability of the inner wall 33 of each of said second parts 32 of each of the closing sleeves 30.

FIG. 9 shows a second embodiment of a flask 110 according to the invention, said flask 110 being provided with a bottom 111 and an upper end 112. Said flask 110, which is open at its upper end 112, is provided with an opening 114 suitable for allowing the contents of said flask 110 to flow. Mounting means 113 are present at the exterior of the flask 110, close to the upper end 112. According to the embodiment depicted in FIG. 9, said mounting means 113 appear in the form of a thread, said thread serving to mount the closing sleeve 130 on the flask 110. The closing sleeve 130 is therefore screwed onto the thread 113 with the aid of its first part 131.

A joining element 115 is also shown in FIG. 9, said joining element 115 being suitable for being inserted between the flask 110 and the first part 131 of the closing sleeve 130. The joining element 115 is produced from a material which is relatively pliable compared to the material used for producing the flask 110 and the closing sleeve 130. As a consequence, as soon as it is assembled, the joining element 115 ensures impermeability between the flask 110 and the closing sleeve 130.

The flask 110 is made from a suitable material which makes it possible to protect a substance contained inside it before it is used. Said flask 110 may, for example, be made from a material such as glass. The closing sleeve 130, for its part, is made from a plastic material such as HDPE or PP. The closing sleeve 130 is provided, in its interior, with a membrane which makes it possible to separate its first part 131 from its second part 132. Said membrane is not shown in FIG. 9. However, its form and its functionality are similar to those of the membrane 35 such as depicted in FIG. 3.

Furthermore, in addition to the membrane integrated within the closing sleeve 130, it is possible to integrate a second membrane 136 between said closing sleeve 130 and the joining element 115. Said membrane 136 may be made of a material such as aluminium and may be premounted on the upper face (in the orientation as shown in FIG. 9) of the joining element 115. Such a membrane 136 has not been shown in combination with the first embodiment as shown in FIGS. 1 to 6. It should be noted that such a membrane may be positioned on the joining element 15 as shown in FIGS. 1 and 3. The exterior of the second part 132 of the closing sleeve 130 is provided with a thread 138. Said thread 138 is used to mount a lid 140 on the exterior. Once the lid 140 is mounted on the thread 138, at the exterior of the second part 132 of the closing sleeve 130, a tamper-proof ring 141 is automatically mounted, under the effect of its plastic deformation, behind the edge 139 at the end of said closing sleeve 130. A frangible zone 142 is present between the lid 140 and the tamper-proof ring 141, said frangible zone 142 being fashioned so as to be breakable during the first opening of the lid 140 with the aid of the thread 138.

According to the present invention, the closing sleeve 130 and the lid 140 are obtained by means of a simultaneous injection-moulding method. This indicates that said closing sleeve 130 and said lid 140 are directly assembled as soon as they are extracted from their respective mould, which guarantees that the interior of the second part 132 of said closing sleeve 130 and the interior of the lid 140 are perfectly sterile. The production and the assembly of the closing sleeve 130 and the lid 140 are similar to those of the closing sleeve 30 and the lid 40, such as described by making reference to the paragraphs above relating to FIGS. 7 and 8.

FIG. 9 shows the joining element 115 provided with an opening 117, said opening 117 being used in a lyophilisation method.

The method of filling the flask 110 according to the present invention breaks down as follows. The flask 110 is pre-sterilised during a suitable method, for example, the use of gamma rays or ethylene oxide. After said pre-sterilisation, said flask 110 circulates on an aseptic production line and is filled with the aid of a sterile solution comprising at least one active ingredient and water, which are then subjected to freeze-drying conditions. At the end of this step, the joining element 115 that is provided with a membrane 136 at its upper surface penetrates into the opening 114 of the flask 110. Firstly, the joining element 115 is introduced with the aim of keeping at least part of the opening 117 outside the flask 110. After this step, the assembly made up of the flask 110 and the joining element 115 is introduced into a chamber intended for the lyophilisation step. At the end of said lyophilisation process, the joining element 115 is sunk fully into the opening 114 of the flask 110. Next, the assembly made up of the closing sleeve 130 and the lid 140 is mounted on the flask 110 with the aid of the thread 113 on the one hand and, on the other hand, with the aid of a complementary thread situated inside the first part 131 of the closing sleeve 130.

By virtue of the co-fabrication of the closing sleeve 30, in combination with the lid 40, or the closing sleeve 130 and the lid 140, the sterility of the respective inner wall 33, 133, the respective closing sleeve 30, 130 and the interior of the respective lid 40, 140 is guaranteed.

The invention claimed is:

1. A connection system including a first and a second container, said connection system comprising:

a closing sleeve, provided with a first part permanently mounted on the first container to protect a sterile interior of the closing sleeve, and said closing sleeve also being provided with a second part which is suitable for allowing the temporary mounting of the opening of the second container;

a membrane separating said first and said second part of said closing sleeve, said membrane being suitable for being perforated by the second container during the mounting of the latter on the second part of the closing sleeve;

a lid intended for closing off the second part of the closing sleeve before the connection system is used, said lid and said closing sleeve being obtained by means of a simultaneous method of moulding by injection of at least one plastic material, the lid being mounted on the second part of the closing sleeve once the lid and the closing sleeve have exited their respective moulds; and wherein the second container comprises a dispenser to be introduced in said second part of said closing sleeve to perforate said membrane and continue to advance until said dispenser is received inside an opening of a joining element inserted between the first container and said first part of said closing sleeve and wherein a second membrane is integrated between the closing sleeve and the joining element.

2. The system for connecting containers which is intended for the temporary assembly of said containers according to claim 1, the lid being mounted on the second part of the closing sleeve before the lid and the closing sleeve are cooled to ambient temperature.

3. The system for connecting containers which is intended for the temporary assembly of said containers according to claim 1, wherein the membrane is an integral element of the closing sleeve and comprises a plastic material that is same as a material used for the first part and the second part of the closing sleeve.

4. The system for connecting containers which is intended for the temporary assembly of said containers according to claim 1, wherein the lid is provided with a frangible zone in the form of a tearable tab, suitable for being pulled off and thus facilitating the removal of said lid from the second part of the closing sleeve.

5. The system for connecting containers which is intended for the temporary assembly of said containers according to claim 1, wherein the lid is provided with a tamper-proof ring suitable for being separated from the body of said lid during the initial opening of said lid.

6. The system of claim 1, wherein the second membrane includes aluminum material and is pre-mounted on a surface of the joining element interfacing with the second part of the closing sleeve.

7. The system of claim 1, wherein the flask packages a substance including at least one of: a powder, a lyophilizate or a liquid.

8. A method for obtaining connection a system including a first container and a second container, said connection system comprising a closing sleeve provided with a lower part permanently mounted on the first container to protect sterile interior of the closing sleeve, provided with an upper part which is suitable for allowing the mounting of the opening of the second container and provided with an integrated membrane, said membrane separating the upper part from the lower part of the closing sleeve, said membrane being suitable for being perforated by the second container when the latter is mounted on the upper part of the closing sleeve, characterised in that said method comprises the following steps:

forming the closing sleeve and the lid by using a simultaneous method of moulding by injection of at least one plastic material, assembling the lid and the closing sleeve upon extraction of the lid and the closing sleeve from their respective moulds, forming a dispenser of the second container to be introduced in said second part of said closing sleeve to perforate said membrane and continue to advance until said dispenser is received inside an opening of a joining element inserted between the first container and said first part of said closing sleeve, wherein a second membrane is integrated between the closing sleeve and the joining element, and mounting the lid on the second part of the connection device in order to thus close off said second part of the closing sleeve, once the lid and the closing sleeve have exited their respective moulds.

9. The method for obtaining a system for connecting containers which is intended for the temporary assembly of a first and a second container according to claim 8, wherein the lid is mounted on the second part of the closing sleeve before said lid and the closing sleeve are cooled to ambient temperature.

10. The method of claim 8, comprising:

performing pre-sterilization of the interior of the closing device using at least one of: gamma rays or ethylene oxide.

11. The method of claim 8, comprising:

filling the flask with a sterile solution comprising at least one active ingredient; and subjecting the flask to freeze-drying conditions.

* * * * *